United States Patent [19]
Gray

[11] 3,817,350
[45] June 18, 1974

[54] PORTABLE SPORTMAN SEAT
[76] Inventor: Zane P. Gray, Rt. 5, Box 307A, Greenville, Tex. 37743
[22] Filed: Feb. 12, 1973
[21] Appl. No.: 331,489

[52] U.S. Cl. ............................................. 182/187
[51] Int. Cl. .............................................. A47c 9/10
[58] Field of Search .................... 182/187, 120, 121

[56] References Cited
UNITED STATES PATENTS

| | | | |
|---|---|---|---|
| 1,535,978 | 4/1925 | Baker | 182/187 |
| 3,006,433 | 10/1961 | Farver | 182/187 |
| 3,030,160 | 4/1962 | Tandy | 182/187 |
| 3,340,828 | 9/1967 | Smith | 182/187 |
| 3,358,789 | 12/1967 | Laun | 182/187 |
| 3,460,649 | 8/1969 | Baker | 182/187 |

*Primary Examiner*—Reinaldo P. Machado
*Attorney, Agent, or Firm*—H. Mathews Garland

[57] ABSTRACT

A portable seat device for use particularly in trees by hunters and the like including a body supporting seat, a foot support connected to the forward edge of the seat to support the feet of the user, a first support frame hinged at a lower end along the back edge of the seat for engaging the surface of a tree trunk or other supporting column, a second support frame pivoted at an upper end with the upper end of the first support frame and extending downwardly and outwardly at an angle with a lower end selectively engageable in selected pairs of slots of the seat for supporting the seat at a desired angle, and a chain assembly secured with the upper end of the second support frame for securing around a tree trunk above a limb extending from the truck to hold the seat on the tree. The seat is fully collapsible for carrying and may be quickly secured with any tree or other somewhat vertical column having a generally horizontal member such as a limb. The seat inclination may be adjusted to compensate for variations in the vertical angle of the tree or other supporting column.

2 Claims, 8 Drawing Figures

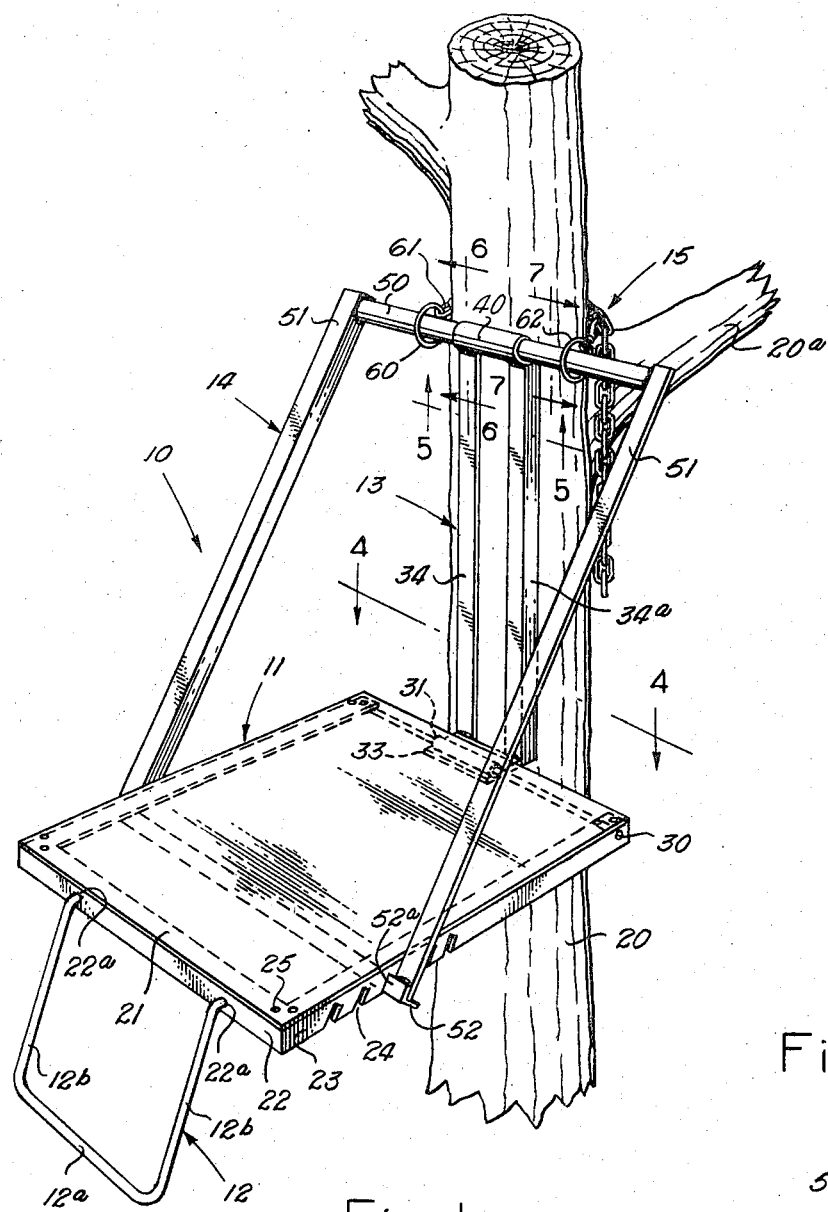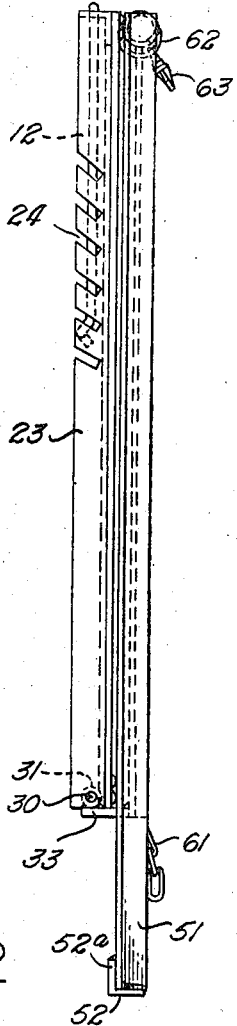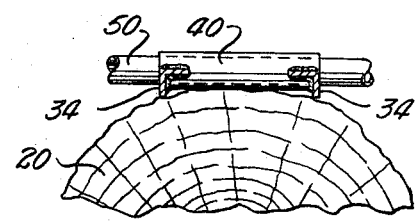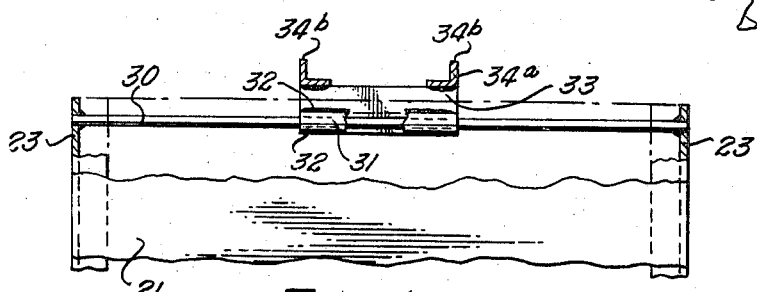

PORTABLE SPORTSMAN SEAT

This invention relates to portable seats and more particularly relates to seats especially useful for hunters and other sportsmen to provide a temporary surface on which to sit in a tree or similar structure.

Portable seats for use by sportsmen have been known and several have been the subject of issued patents. Generally, such seats are somewhat bulky and complex in their construction and do not provide satisfactory seating and handling for the user. Some such seats have supporting structure which is somewhat cumbersome to assemble on a tree and which does not provide support at the proper locations for stability of the seat when a hunter is sitting on it. For example, several of the seats have supporting structure which extends completely downwardly from the back edge of the seat which provides an unstable surface. Other seat devices have a securing means between the seat and the tree which extends around the tree at a location on the device creating instability in supporting the seat and causing substantial forces against the securing member encircling the tree increasing the likelihood of that member breaking and thus requiring in some cases heavier and stronger material. Some existing seat devices are not adequately adjustable to compensate for variations in the angle of the supporting tree trunk, while those that are adjustable use a means which may readily loosen by sitting on the seat so that there is a question about the safety of use.

Accordingly, it is a principal object of the invention to provide a new and improved seat device for use by hunters and other sportsmen.

It is another object of the invention to provide a portable seat which is supported on a tree trunk or a similar generally vertical column.

It is another object of the invention to provide a portable seat which has a supporting frame structure of maximum stability.

It is another object of the invention to provide a portable seat which is easily secured on a tree.

It is another object of the invention to provide a portable seat which has a means for adjusting the angle of the seat to accommodate it to variations in tree or column angle.

In accordance with the invention, there is provided a portable seat device for sportsmen which includes a seat for supporting the body of the user, a first support frame secured at a lower end with a back edge of the platform, a second support frame pivotally secured at an upper end with the upper end of the first support frame and adjustable connectible at a plurality of locations at the lower end with outward portions of the seat for adjusting the inclination of the seat, a chain assembly securable with the upper end portion of the second support frame and connectible around a tree to hang the seat from a tree or a similar column, and a foot rest connected with the forward edge of the seat to support the feet of the user. The seat is fully collapsible for carrying.

The details of a preferred embodiment of the invention together with its objects and advantages as set out above will be better understood from the following description taken in conjunction with the accompanying drawings wherein:

FIG. 1 is a perspective view of the portable seat device connected on a tree;

FIG. 2 is an enlarged side view of the seat folded for carrying;

FIG. 4 is a fragmentary view in section and elevation along the line 4—4 of FIG. 1;

FIG. 5 is a fragmentary view in section and elevation along the line 5—5 of FIG. 1;

Figure 8:
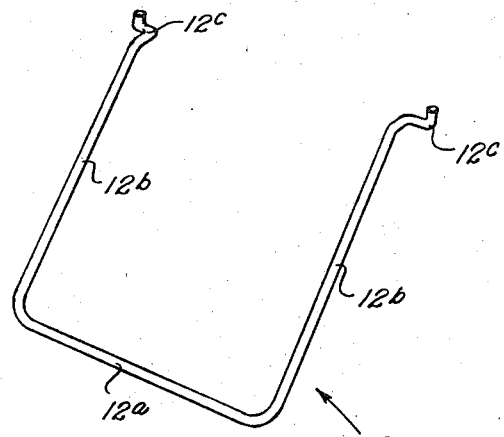
FIG. 8 is a perspective view of the foot rest.

Referring to the drawings, a portable seat device 10 embodying the invention includes a seat 11, a foot rest 12 secured at the front edge of the seat, a first support frame 13 connected at a lower end with a back edge of the seat and adapted to lie along the surface of a tree trunk, a second support frame 14 connected at an upper end with the support frame 13 and adjustably connectible with the seat at a lower end, and a chain assembly 15 for hanging the seat on a tree trunk 20. The seat device may be folded to the substantially flat configuration of FIG. 2 for carrying and is adjustable as represented in FIG. 3 to accommodate the seat to varying tree trunk angles.

Figure 3:
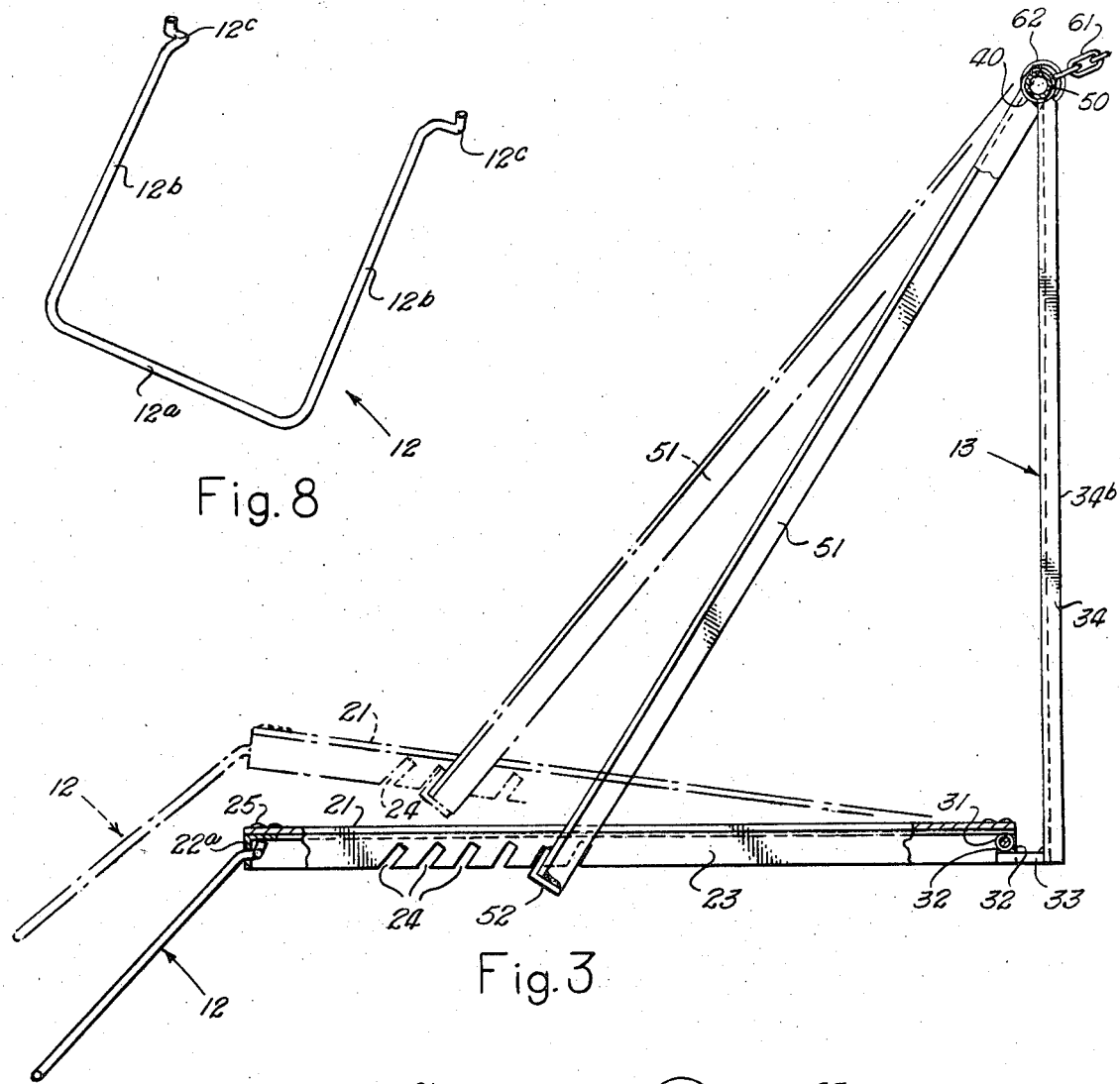
FIG. 3 is a side view in elevation of the seat device showing in phantom lines moved positions of the seat, the second bracket assembly, and the foot rest to illustrate the adjustable feature of the seat.

The seat 11 is formed by a rectangular top plate 21 secured on a front edge angle member 22 and identical side edge angle members 23, each of which is provided with upwardly and rearwardly angled downwardly opening slots 24 for adjusting the angular position of the seat as in FIG. 3. The plate 21 is connected with the angle members by plurality of brads 25. The angle members preferably are welded together at adjoining corner edges. A round rod 30 is secured by welding along opposite rod end portions through the edge angles 23 below and inwardly of the back edge of the top plate 21 as illustrated in FIG. 4.

The lower end of the first support frame 13 is pivotally secured by a bearing sleeve 31 to the rod 30 at the back edge of the seat plate. The structure of the connection between the first support frame and the seat 11 is illustrated in FIGS. 3 and 4. The bearing sleeve 31 fits over the rod 30 with sufficient tolerance to permit the sleeve to rotate on the rod with freedom adequate to permit the seat to be folded to the configuration of FIG. 2 and to be adjusted as seen in FIG. 3. The sleeve 31 is welded along the full length of the sleeve bottom as designated by the reference 32 to a rectangular hinge plate 33.

The connection of the sleeve 31 with the hinge plate 32 is along the front portion of the hinge plate so that the sleeve is sufficiently spaced from the back edge of the hinge plate as particularly evident in FIG. 3 to permit the upward folding of the seat 11 so that it can be folded for carrying as in FIG. 2. The back edge of the hinge plate 33 is welded to a pair of spaced parallel vertical angle members 34 of the first support frame 13. The angle members 34 are oriented such that the back plate portions 34a of the members form vertical edges 34b for engagement with the tree trunk surface to minimize slippage of the portable seat device on the tree surface. Depending upon the weight of the person sitting on the portable seat, the edges 34b might bite somewhat into the bark of the tree, particularly along the lower end portions of the edge surfaces. An upper bearing sleeve 40 is welded to the upper ends of the vertical angle members 34 of the support frame 13. As particularly evident in FIGS. 1 and 3, the bearing sleeve 40 is secured slightly forward relative on the angle members 34 so that the back surface of the bearing sleeve generally will not engage the tree surface leaving the entire length of the angle member edges 34b for engagement with the tree surface and thus preventing any possibility of the bearing sleeve propping any of the first support frame 13 away from the tree along the upper end portion of the frame. FIG. 5 illustrates the engagement of the back angle member edges 34b with the bark surface of the tree 20 and also emphasizes the need for the forward positioning of the bearing sleeve 40 to clear the arcuate curved portion of the tree surface between the side angle members 34.

The second support frame 14 includes a tubular upper end member 50 which slidably fits through the upper bearing sleeve 40 on the first support frame 13 to permit both the folding of the portable seat device for carrying and the adjusting of the seat 11 to the various required angles as suggested in FIG. 3. The opposite ends of the member 50 are welded to side angle members 51 of the second support frame 14. A bottom angle member 52 is secured at opposite end portions to the lower ends of the side angle members 51 of the second support frame. When the seat is open for use, as shown in FIG. 1, the angle member 52 is disposed across and under the seat 11 with the upwardly extending portion 52a of the angle member engaged in a suitable pair of the slots 24 along the side edge angle members 23 of the seat so that the seat effectively hangs from the lower ends of the first and second support frames.

Figures 6, 7:
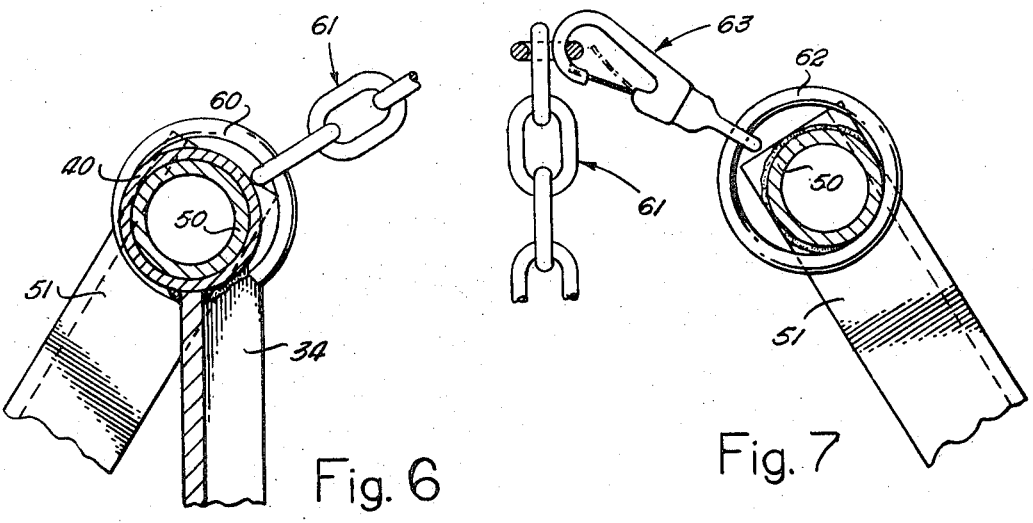
FIG. 6 is an enlarged fragmentary view in section and elevation along the line 6—6 of FIG. 1.
FIG. 7 is an enlarged fragmentary view in section and elevation along the line 7—7 of FIG. 1.

The portable seat device is held in the tree 20 by the chain 15 which encircles the tree and connects at opposite ends with the tubular member 50 on the second bracket assembly 14 of the portable seat. The chain assembly includes a ring 60 which is substantially larger than the tubular member 50 and disposed on the tubular member 50 on one side of the bearing sleeve 40 for connecting an end link of a chain 61 to the support frame 14. Another ring 62 of the same diameter on the ring 60 is disposed on the tubular member 50 on the other side of the bearing sleeve 40. A spring loaded catch 63, shown in detail in FIG. 7, is connected on the ring 62 and is engageable with either the other end link or one of the intermediate links of the chain 61 to secure the portable seat on the tree trunk. As shown in FIGS. 1 & 7, the catch 63 is engaged with one of the intermediate links of the chain as the tree trunk is not of a sufficiently large enough diameter to require the full chain length. It will be evident that the fact that the catch 63 may be connected with any one of a substantial number of the chain links permits a wide range of adjustments to be made in the effective length of the chain available for securing the portable seat on a tree and thus accommodates the seat to a variety of tree trunk sizes.

The foot rest 12 comprises a U-shaped rod having a central horizontal portion 12a and side portions 12b, each of which has a hooked upper end portion 12c, see FIG. 8, for retaining the foot rest with the seat 11 while permitting it to be extended for a foot support as in FIGS. 1 & 3, and folded as in FIG. 2. The foot rest side portions extend through a pair of spaced holes 22a in the front edge angle member 22 of the seat. The hooked end portions 12c of the foot rest are disposed inwardly of the angle member 22 as best seen in FIG. 3 holding the foot rest engaged with the seat while permitting the foot rest to be lifted from the position of FIG. 3 to a horizontal position, not shown, at which it may be pushed into a folded or nested relationship as shown in FIG. 2.

The portable seat device 10 is readily carried in the folded form as represented in FIG. 2. The folded seat device is substantially flat and may be carried by grasping at the sleeve bearing 40 of the first support frame 13. When a tree is reached on which it is desired to use the portable seat, the upper end of the folded seat as defined by the members 40 and 50 on the support frames 13 and 14 is placed in a substantially horizontal position across a tree trunk, such as the trunk at 20 in FIG. 1, aligned slightly above a limb 20a at the height at which it is desired to secure the seat. The chain 61, which is permanently secured at one end to the ring 60, is wrapped around the tree above the limb 20a, drawn taut and connected by the appropriate link to the spring clasp 63 on the other ring 62 on the other side of the tree trunk. The seat 11 is then lowered outwardly and downwardly pivoting on the rod 30 at the edge near the tree trunk. The support frame 14 is pivoted outwardly and upwardly about the connection of the tubular member 50 through the sleeve bearing 40 until the lower end of the support frame 14 is at an angular position as seen in FIGS. 1 & 3 at which the seat 11 is substantially horizontal. The lower angle member 52 on the support frame 14 is inserted into the nearest slots 24 along the side edge angle members 23 to support the seat at the desired angle. The side angle members 34 of the first support frame 13 are aligned vertically down the tree trunk surface with the inside edges 34b of the angle members engaging the bark surface of the tree for minimizing any movement or swinging effect of the seat device along the tree trunk. If the foot rest is desired, it is grasped by the horizontal rod portion 12a, pulled straight outwardly in a line with the seat 11, and dropped downwardly pivoting about the hooked upper end portions 12c to a position generally represented in FIG. 3 at which the feet of the user may rest upon the horizontal rod portion 12a.

The user can climb into the seat and rest comfortably on a stable seat 11 while carrying out his activities which may be hunting, bird watching, photography, and the like. The stability of the portable seat device permits the user to move about in a seated position firing a gun or carrying out other necessary procedures without fear of losing his balance and falling. The entire weight of the seat and the user is supported below the securing chain assembly 15 so that there is a minimum tendency of the seat to tip to one side because of a low center of gravity relationship as compared with other portable seats. The angular position of the supporting frame 14 above the seat 11 enhances the stability of the apparatus. The forces resulting from the weight of the user and forces resulting from his movement on the seat tend to act about the axis of the members 40 and 50 at the upper end of the seat causing turning forces about such axis to force the angle members 34 of the vertical support frame 13 to bite into the tree bark a little more tightly further stabilizing the portable seat. The angular position of the support frame 14 and the fact that the seat hangs at the lower end of the support frame 13 improves the stability, as the seat is not as inclined to tend to tip forward as other portable seat designs. By locating the lower end of the frame 14 and the slots 24 as far outwardly on the seat as practicable, only minimum forces tend to turn the seat platform about the member 52 to lift the end of the seat adjacent to the tree. If the user desires to lean back somewhat, the seat may be placed at the angular position shown in the phantom lines of FIG. 3 which would still further stabilize the seat on the tree.

When the seat is to be moved from the position in the tree shown, the chain 61 is disengaged from the tree trunk by releasing the chain link coupled with the clasp 63. The foot rest 12a is then lifted into alignment with the seat platform and pushed inwardly until the side portions 12b are fully inserted through the angle member 22 beneath the seat platform plate 21. The lower angle member 52 of the bracket assembly 14 is disengaged from the slots 24 of the seat and the seat is lifted upwardly pivoting about the rod 30 to a position at which it is folded into parallel adjacent relationship with the support frame members 34, and the support frame 14 is folded downwardly and inwardly about the bearing sleeve 40 into the same general plane as the frame 13 so that the entire portable seat is folded as shown in FIG. 2. In folding the seat upwardly toward the frame 13, the rear edge of the seat, as evident in FIG. 3, is revolved into the space shown above the hinge place 33. If a cushion is desired on the seat plate, the seat device may be designed with a deeper hinge plate 33 so that more space exists between the rear edge of the seat plate 21 and the front faces of the angle members 34 to provide sufficient space for folding the cushion between the seat plate and the frame 13 when the seat device is closed for carrying as in FIG. 2. The chain 61 may be allowed to hang free as shown in FIG. 2 or the free end of the chain may be reconnected with the clasp 63.

What is claimed is:

1. A portable seat device for connection with a tree and the like comprising: a substantially rectangular seat including a flat top plate for supporting the body of the user, a forward edge angle member secured on the bottom face of said top plate, and side edge angle members secured beneath and along side edges of said top plate; said side angle members having a plurality of downwardly opening spaced slots for receiving a cross member to support said seat at a desired angle of inclination, a rod connected along the back edge of said seat between back end portions of said side angle members beneath said top plate; a sleeve bearing secured on said rod providing a pivotal connection with said seat; a hinge plate secured with said sleeve bearing; a first support frame secured at a first end with said hinge plate and adapted to pivot through an arc of at least 90° relative to said seat between folded and unfolded positions, said first support frame being adapted to lie along the surface of a tree trunk; a second support frame pivotally secured at a first end with the second end of said first support frame and having said cross member at a second end selectively securable into corresponding slots in said side angle members of said seat for supporting said seat at a desired inclination relative to said tree trunk, said second support frame extending downwardly and outwardly from said second end of said first support frame when said portable seat device is secured on said tree trunk; and a flexible elongated securing member connectible with said first end of said second support frame for encircling said tree trunk to support said portable seat device from said tree.

2. A portable seat in accordance with claim 1 including a foot rest connected with the forward edge of said seat for movement between a collapsed folded position and an unfolded downwardly projecting position for supporting the feet of a user seated on said seat.

* * * * *